(12) United States Patent
Ihashi

(10) Patent No.: US 7,526,404 B2
(45) Date of Patent: Apr. 28, 2009

(54) PEDOMETER

(75) Inventor: Tomohiro Ihashi, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 11/900,437

(22) Filed: Sep. 12, 2007

(65) Prior Publication Data
US 2008/0077354 A1  Mar. 27, 2008

(30) Foreign Application Priority Data
Sep. 21, 2006 (JP) .............. 2006-255445

(51) Int. Cl.
*G06F 15/00* (2006.01)
*G01C 22/00* (2006.01)

(52) U.S. Cl. .................................... 702/160

(58) Field of Classification Search ........... 702/127, 702/160; 482/8, 54; 377/24.2
See application file for complete search history.

(56) References Cited

U.S. PATENT DOCUMENTS

| 4,855,942 A | 8/1989 | Bianco |
| 4,962,469 A | 10/1990 | Ono et al. |
| 5,164,967 A * | 11/1992 | Endo et al. .................. 377/24.2 |
| 5,446,775 A | 8/1995 | Wright et al. |
| 5,475,725 A * | 12/1995 | Nakamura .................. 377/24.2 |
| 6,305,221 B1 | 10/2001 | Hutchings |
| 2004/0186695 A1* | 9/2004 | Aoshima et al. ............ 702/190 |
| 2005/0240375 A1 | 10/2005 | Sugai |
| 2006/0143645 A1 | 6/2006 | Vock et al. |

FOREIGN PATENT DOCUMENTS

| EP | 1 336 712 A1 | 12/2003 |
| JP | 0002612 | 1/1990 |
| JP | 2004290658 | 10/2004 |

* cited by examiner

*Primary Examiner*—Bryan Bui
(74) *Attorney, Agent, or Firm*—Adams & Wilks

(57) ABSTRACT

To provide a pedometer capable of measuring a number of steps in walking and in running by using one sensor and by a small circuit scale. A sensor is mounted on the arm such that a sensitivity axis on the sensor is disposed in a length direction of the arm and a number of steps is measured in walking and in running. When a measuring mode is a walking mode, a detecting signal from the sensor is counted as one step, when the measuring mode is a running mode, the detecting signal from the sensor is counted as two steps to thereby accurately measure a number of steps in accordance with the measuring mode.

20 Claims, 4 Drawing Sheets

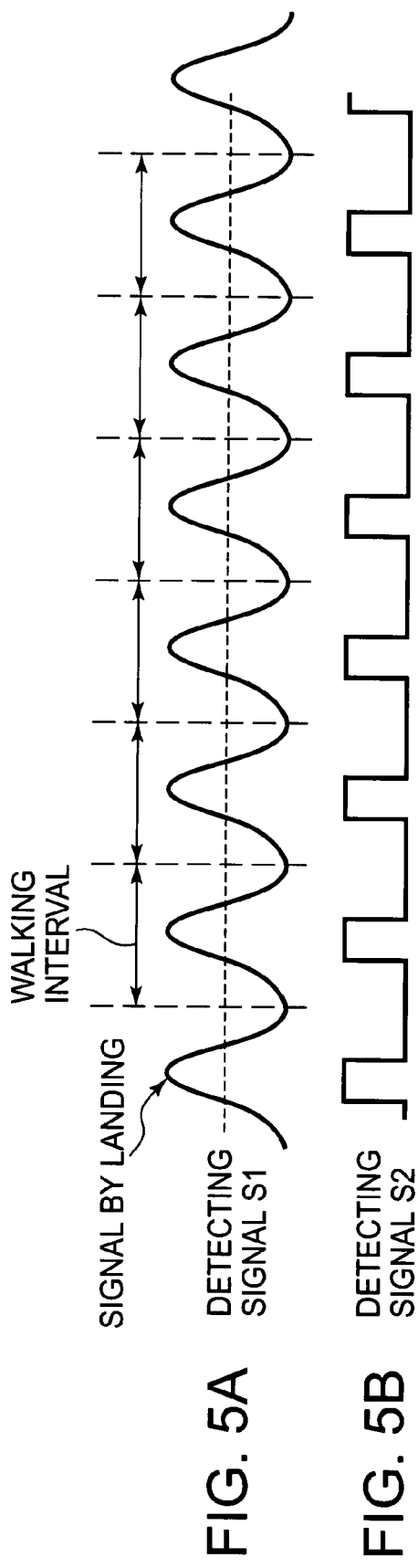
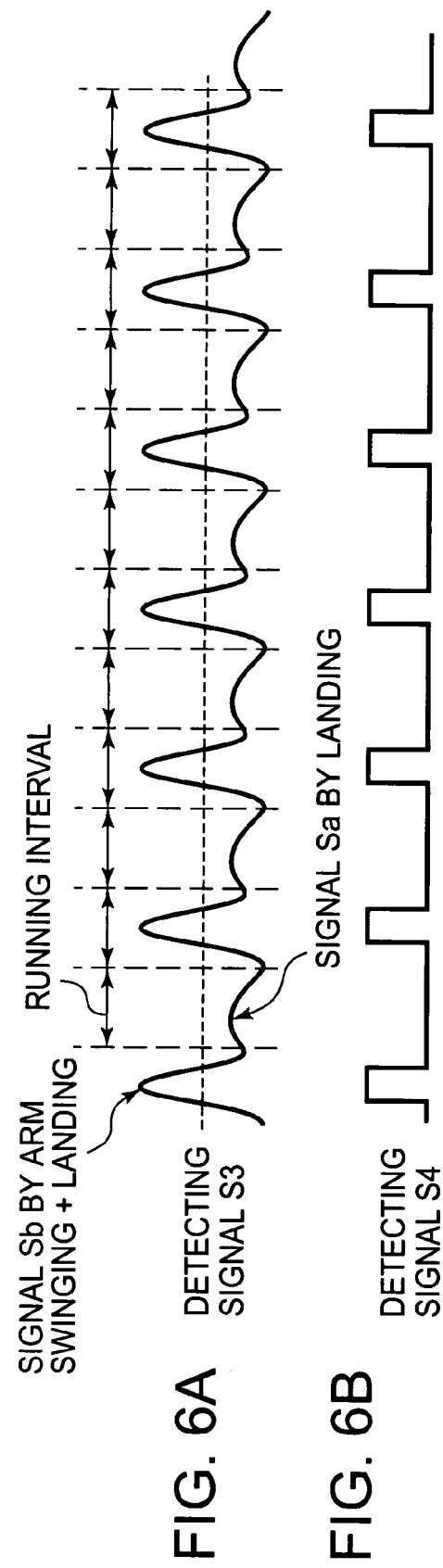

PEDOMETER

BACKGROUND OF THE INVENTION

1. Field of the Invention

The present invention relates to a pedometer for measuring the number of steps by detecting walking of a human body, particularly relates to a pedometer having a step number measuring function in walking and in running.

2. Description of the Related Art

In a background art, various pedometers capable of measuring the number of steps in walking and in running have been developed.

For example, according to a pedometer described in JP-UM-A-2-612 (column of scope of claims, FIG. 4), one sensor is mounted in a direction in which a sensitivity axis of the sensor is orthogonal to a length direction of the arm (12 o'clock-6 o'clock direction of timepiece), as a direction of detecting a physical motion, arm swinging is detected in walking and detecting a physical motion produced in an up and down direction of the body by an impact of landing in running to thereby enable to measure the number of steps in walking and in running.

However, although according to the pedometer, only the one sensor is used, a rear stage of the sensor needs to be prepared with two filters of a filter with an object of passing about 45 steps/minute to 60 steps/minute in walking (a normally assumed walk pitch is 90 steps/minute to 120 steps/minute, one swing is constituted by two steps when arm swinging is used for detection, and therefore, an output from the sensor is constituted by 45 steps/minute through 60 steps/minute of a value of a half of the 90 steps/minute through 120 steps/minute), and a filter with an object of passing 170 steps/minute through 190 steps/minute in running (a normally assumed running pitch in running is 170 steps/minute through 190 steps/minute and when landing is used for detection, the output from the sensor is constituted by the same 170 steps/minute through 190 steps/minute), and it is necessary to switch the filters in accordance with either of cases of detecting walking and running. Therefore, a problem of enlarging a circuit scale is posed.

Further, both in walking and running, one sensor output signal is counted as two steps, and therefore, regardless of the fact that one sensor output and one step correspond to each other in running, one sensor output signal is abandoned, a successive or preceding sensor output signal is counted as two steps, and therefore, depending on setting a mask time period, there poses a problem of bringing about a measurement error.

On the other hand, according to the invention described in JP-A-2004-290658 (paragraphs [0015] through [0020], FIG. 1 through FIG. 10), detection of the number of steps in walking and in running is realized by providing two sensors having sensitivity axes different from each other and a frequency analyzing portion.

However, according to the method, not only the two sensors are needed but also the frequency analyzing portion needs to be provided and there poses a problem that the circuit scale is enlarged.

It is a problem of the invention to provide a pedometer capable of measuring the number of steps in walking and in running by using one sensor and by a small circuit scale.

SUMMARY OF THE INVENTION

According to the invention, there is provided a pedometer characterized in being used by being mounted to the arm of a measured person such that a sensitivity axis is disposed in a length direction of the arm and comprising one sensor for detecting a physical motion of the measured person and outputting a detecting signal in correspondence therewith, and step number calculating means for calculating a number of steps based on the detecting signal of the sensor.

The sensor is used by being mounted to the arm of the measured person such that the sensitivity axis is disposed in the length direction of the arm, detects the physical motion of the measured person and outputs the detecting signal in correspondence therewith. The step number calculating means calculates the number of steps based on the detecting signal from the sensor.

Here, there may be constructed a constitution further comprising measuring mode setting means for setting a mode of measuring the number of steps to either of a walking mode of measuring the number of steps in walking and a running mode of measuring the number of steps in running, wherein the step number calculating means carries out a processing of calculating the number of steps in accordance with the measuring mode.

Further, there may be constructed a constitution in which the step number calculating means carries out the processing of calculating the number of steps by constituting one step by each of the detecting signals received from the sensor in the walking mode and carries out the processing of calculating the number of steps by constituting two steps by each of the detecting signals received from the sensor in the running mode.

Further, there may be constructed a constitution in which the measuring mode setting means comprises an operating switch.

Further, there may be constructed a constitution in which the sensor outputs the detecting signal in correspondence with landing motion of the measured person in walking and outputs the detecting signal in correspondence with an arm swinging motion of the measured person in running.

According to the invention, the number of steps in walking and in running can be measured by using the one sensor and by a circuit having a small scale.

BRIEF DESCRIPTION OF THE DRAWINGS

FIG. 5 illustrates timing charts of the pedometer according to the embodiment in walking.

FIG. 6 illustrates timing charts of the pedometer according to the embodiment in running.

DESCRIPTION OF THE PREFERRED EMBODIMENTS

Figure 1:
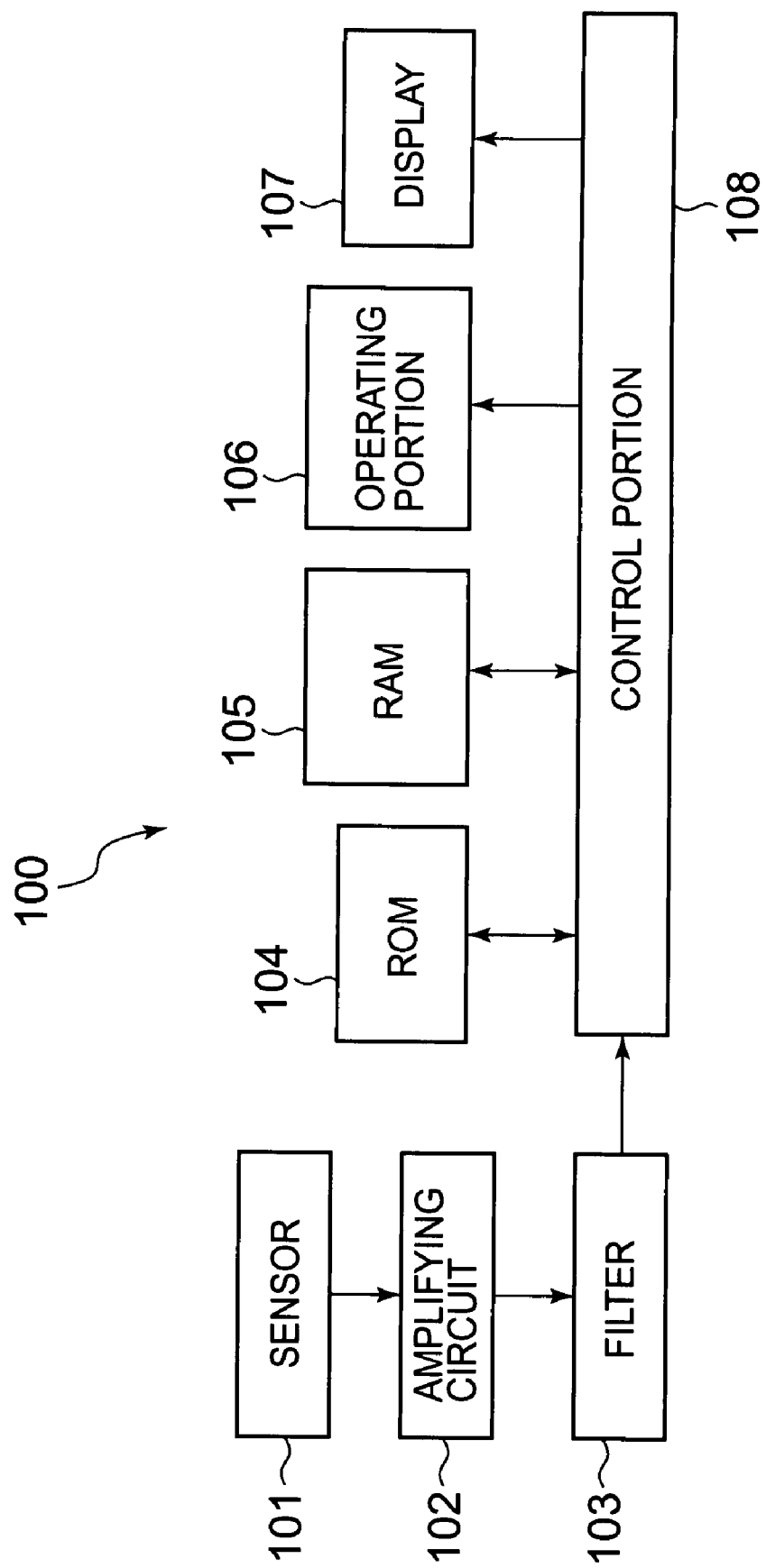
FIG. 1 is a block diagram of a pedometer according to an embodiment of the invention.

FIG. 1 is a block diagram of a pedometer 100 according to an embodiment of the invention.

In FIG. 1, the pedometer 100 includes a sensor for walking (an acceleration sensor according to the embodiment) 101 for outputting a corresponding detecting signal at each time of detecting a physical motion of a measured person, an amplifying circuit 102 for amplifying to output the detecting signal from the sensor 101, a filter 103 for passing the detecting signal by removing a noise produced by the physical motion or the like in a signal from the amplifying circuit 102, a read only memory (ROM) 104 previously stored with a program or the like, a random access memory 105 for storing measured step number data or the like, an operating portion 106 for manually switching a measuring mode to either of a walking mode and a running mode, a displaying portion 107 for displaying a calculated number of steps or the like, and a control portion 108 constituted by a central processing unit (CPU) for carrying out a processing of calculating the number of steps in accordance with the measuring mode mentioned later, a control of the respective constituent elements and the like by executing the program stored to ROM 104.

The operating portion 106 is constituted by an operating switch controllable by a user from an outside, and the measuring mode of the pedometer 100 is switched alternately to a walking mode and a running mode at each time of operating the operating portion 106.

The sensor 101 is constituted to be used by being mounted to the arm such that a sensitivity axis thereof is in a direction along a length direction of the arm of a measured person. Here, the direction in which the sensitivity axis of the sensor 101 is along the length direction of the arm of the measured person signifies an angle of the sensitivity axis maximizing the sensitivity is within a range of ±25 degrees relative to the length direction of the arm. For example, the angle includes a case in which the sensitivity axis of the sensor 101 is arranged in 3 o'clock-9 o'clock direction of a timepiece.

The sensor 101 is constituted such that in walking, a physical motion produced in an up and down direction of the body by landing (landing motion) is detected and the detecting signal in correspondence therewith is outputted, and by detecting a signal produced by an arm swinging motion and the landing motion in running, the detecting signal in correspondence with the arm swinging motion is outputted. The detecting signal in correspondence with one time landing motion corresponds to one step walking, and the detecting signal in correspondence with one time arm swinging motion corresponds to two steps running.

Generally, the number of steps is constituted by about 90 steps/minute through 120 steps/minute in walking and about 170 steps/minute through 190 steps/minute in running, and therefore, detecting signals of 90 through 120 pieces/minute are outputted in walking and detecting signals of 170 through 190 pieces/minute are outputted in running. According to the embodiment, the filter 103 is constituted by a characteristic of passing the detecting signals of 90 through 120 pieces/minute in walking and the detecting signals of 85 through 95 pieces/minute constituting a half of 170 through 190 pieces/minute in running, that is, passing the detecting signals within a predetermined frequency range of 85 through 120 pieces/minute. Thereby, there is constructed a constitution of sampling necessary detecting signals by using the one filter.

Further, the control portion 108 is constituted to count one detecting signal outputted from the sensor 101 as one step in the walking mode, counts one detecting signal as two steps in the running mode to thereby enable to measure the number of steps of both in walking and running by the one sensor and the one filter.

Further, the sensor 101, the amplifying circuit 102 and the filter 103 constitute detecting means for detecting walking and outputting the corresponding detecting signal, ROM 104 and RAM 105 constitute storing means, the operating portion 106 constitutes mode setting means, the displaying portion 107 constitutes displaying means. Further, control portion 108 constitutes step number calculating means for calculating the number of steps based on the detecting signal.

Figure 2:
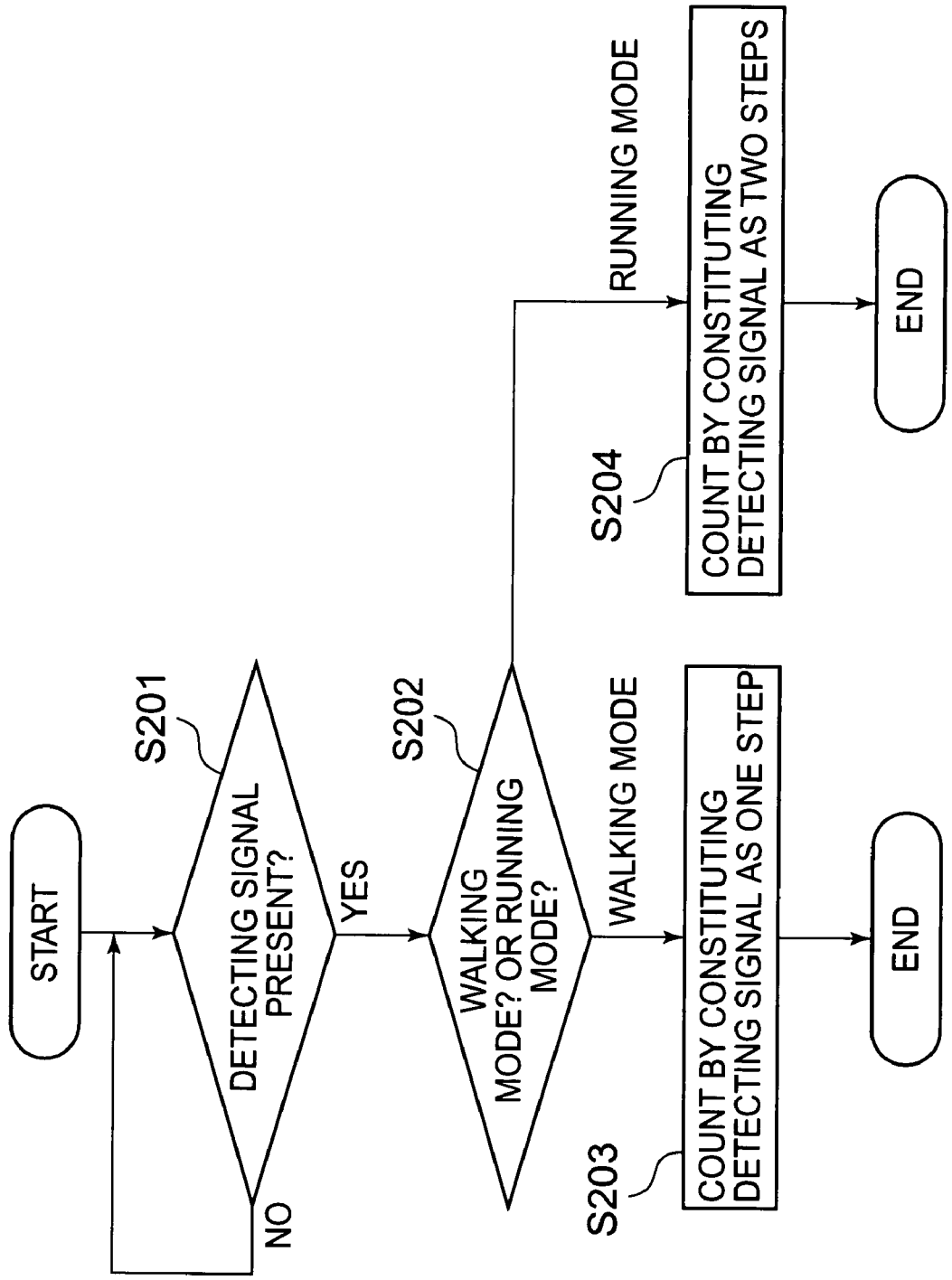
FIG. 2 is a flowchart showing a processing of the pedometer according to the embodiment of the invention.

FIG. 2 is a flowchart showing a processing of the pedometer 100 of FIG. 1, mainly showing a processing carried out by executing the program stored to ROM 104 by the control portion 107.

Figure 3:
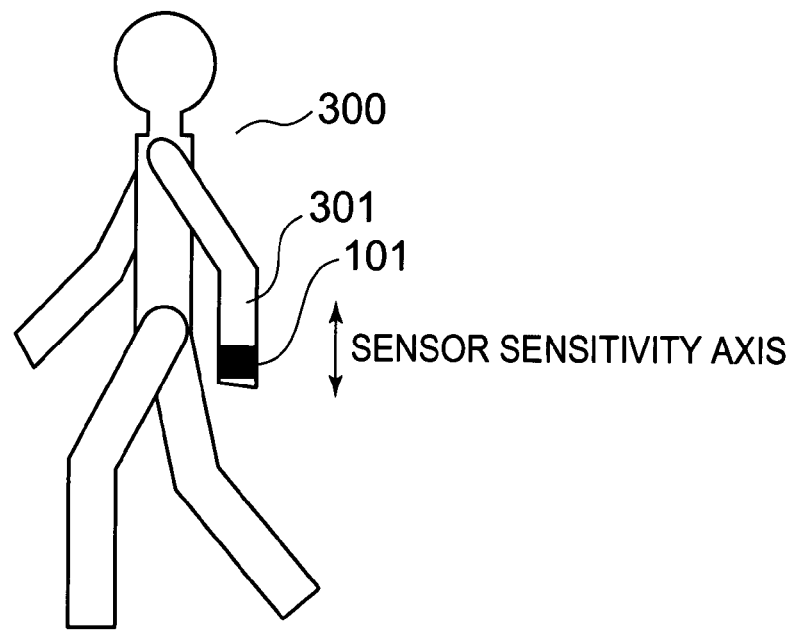
FIG. 3 is an explanatory view of the pedometer according to the embodiment in walking.
Figure 4:
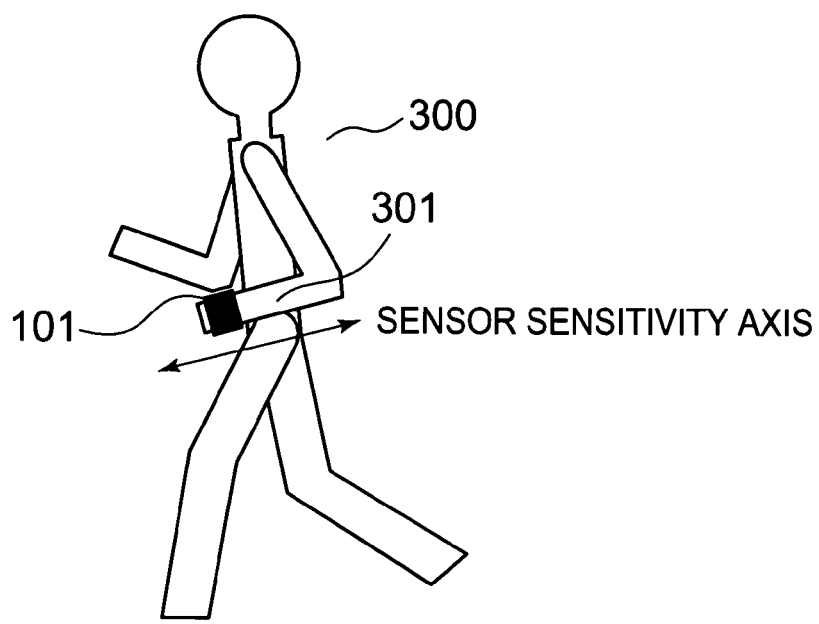
FIG. 4 is an explanatory view of the pedometer according to the embodiment in running.

FIG. 3 is an explanatory view when a measured person 300 is mounted with the sensor 101 of the pedometer 100 according to the embodiment on the arm 301 to carry out walking, and FIG. 4 is an explanatory view when the measured person 300 is mounted with the sensor 101 of the pedometer 100 according to the embodiment on the arm 301 and carries out running.

Although the pedometer 100 according to the embodiment is the pedometer 100 of a wristwatch type used by being mounted to the arm 301 of the measured person 300, it is not necessary to constitute the pedometer 100 to mount all of constituent elements thereof on the arm 301 but may be constituted to be used by mounting at least the sensor 101 on the arm 301 of the measured person 300.

In FIG. 3 and FIG. 4, the pedometer 100 is constituted to be used by being mounted to the arm 301 such that the sensitivity axis of the sensor 101 is disposed in a direction along the length direction of the arm 301 of the measured person (3 o'clock-9 o'clock direction of timepiece). The sensor 101 is mounted to the arm 301 in this way, and therefore, the sensor 101 outputs the detecting signal by detecting a landing motion (up and down motion) of the physical body of the measured person 300 in walking of FIG. 3 and outputs the detecting signal by detecting a signal based on an arm swinging motion and the landing motion of the measured person 300 in running of FIG. 4.

FIG. 5, FIG. 6 are respectively a timing chart in walking and a timing chart in running of the pedometer according to the embodiment.

FIGS. 5A and 5B show a detecting signal S1 outputted by the sensor 101 by detecting landing in walking of the measured person 300, and a detecting signal S2 inputted to the control portion 108 by constituting the detecting signal S1 in a digital signal style.

Further, FIGS. 6A and 6B respectively show a detecting signal S3 constituting a detecting signal outputted by the sensor 101 based on the arm swinging motion and the landing motion by detecting the arm swinging motion and the landing motion in running of the measured person 300 (that is, a detecting signal in correspondence with the arm swinging motion), and a detecting signal S4 inputted to the control portion 108 by constituting the detecting signal S3 in a digital signal style.

An operation of the pedometer according to the embodiment will be explained in details in reference to FIG. 1 through FIG. 6 as follows.

When the number of steps in walking is measured, as shown by FIG. 3, the sensor 101 is mounted on the arm 301 of the measured person 300 such that the sensitivity axis of the sensor 101 is disposed in the length direction of the arm 301 and sets the measuring mode to the walking mode for measuring a number of steps in walking by operating the operating portion 106.

Under this state, when the measured person 300 starts walking, the detecting signal S1 is outputted from the sensor 101 (refer to FIG. 5A). At that occasion, the detecting signal S1 outputted from the sensor 101 is a signal of detecting an up and down motion of the physical body of the measured person 300 (signal detecting an impact by landing) and one detecting signal S1 is outputted per one step.

The detecting signal S1 outputted from the sensor 101 is amplified by the amplifying circuit 102, passes through the filter 103, thereafter, is inputted to the control portion 108 as the detecting signal S2 of the digital signal style (refer to FIG. 5B).

When the control portion 108 receives the detecting signal S1 from the sensor 101 as the detecting signal S2 by way of the amplifying circuit 102, the filter 103 (step S201), the control portion 108 determines to which of the walking mode and running mode the measuring mode is set (step S202).

The measuring mode is set to the walking mode by the operating portion 106, and therefore, the control portion 108 determines the measuring mode as the walking mode at processing step S202, counts each detecting signal S2 as each step and stores an accumulated number of steps to RAM 105 (step S203).

Thereafter, by repeating the processing, the control portion 108 calculates the accumulated number of steps in walking of the measured person 300 to be successively stored to RAM 105 and displays the accumulated number of steps and a number of steps per a predetermined time period (pitch) calculated based on the accumulated number of steps at the displaying portion 107.

On the other hand, when the number of steps in running is measured as shown by FIG. 3, the sensor 101 is mounted on the arm 301 of the measured person 300 such that the sensitivity axis of the sensor 101 is disposed in the length direction of the arm 301 and sets the measuring mode to the running mode by operating the operating portion 106.

Under this state, when the measured person 300 starts running, the detecting signal S3 is outputted from the sensor 101 (refer to FIG. 6A). At that occasion, the detecting signal S3 outputted from the sensor 101 is a signal alternately repeating a signal Sa produced only by the landing motion of the physical body of the measured person 300 and a signal Sb produced by the arm swinging motion and the landing motion (that is, in correspondence with the arm swinging motion).

A signal level of the signal Sa produced only by the landing motion is low, and a signal level of the signal Sb produced by the arm swinging motion and the landing motion is higher than that of the signal Sa. By setting a threshold level of a signal inputted to the control portion 108 larger than the signal Sa and smaller than the signal Sb, the control portion 108 is inputted with the detecting signal S4 at a position in correspondence with the signal Sb. At this occasion, one detecting signal S4 constitutes a signal in correspondence with running of two steps.

The detecting signal S1 outputted from the sensor 101 is amplified by the amplifying circuit 102, passes through the filter 103 and is inputted to the control portion 108 as the detecting signal S4 in the digital signal style (refer to FIG. 6B).

When the control portion 108 receives the detecting signal S3 outputted from the sensor 101 as the detecting signal S4 by way of the amplifying circuit 102, the filter 103 (step S201), the control portion 108 determines to which of the walking mode and the running mode the operating mode is set (step S202).

The operation mode is set to the running mode by the operating portion 106, and therefore, the control portion 108 determines the operation mode as the running mode at processing step S202, counts one detecting signal S4 as two steps and stores an accumulated number of steps to RAM 105 (step S204).

Thereafter, by repeating the processing, the control portion 108 counts the accumulated number of steps in running of the measured person 300 to be successively stored to RAM 105 and displays the accumulated number of steps and a number of steps per a predetermined time period (pitch) calculated based on the accumulated number of steps at the displaying portion 107.

As described above, according to the embodiment, by using respective ones of the sensor 101 and the filter 103, the numbers of steps both in walking and running can be measured, and therefore, the pedometer 100 can be realized by a simple constitution and a circuit scale can be reduced.

Further, although according to the embodiment, the measuring mode is constituted to be set manually by the operating portion 106, there may be constructed a constitution in which walking or running is determined by detecting a moving speed by a speed sensor, and the measuring mode is automatically switched such that the measuring mode is set in accordance with the determination or the like.

The invention is applicable to various pedometers used by being mounted on the arm of the measured person such as a pedometer of a wristwatch type incorporating a wristwatch function and the like.

What is claimed is:

1. A pedometer comprising:
    one sensor for detecting a physical motion of a measured person and outputting a detecting signal in correspondence therewith, the pedometer being mounted to an arm of the measured person such that a sensitivity axis of the sensor is disposed in a length direction of the arm;
    measuring mode setting means for setting a mode of measuring the number of steps to either of a walking mode for measuring the number steps in walking and a running mode for measuring the number of steps in running; and
    step number calculating means for calculating a number of steps of the measured person based on the detecting signal of the sensor and in accordance with the set measuring mode, the step number calculating means carrying out the processing of calculating the number of steps by constituting one step by each of the detecting signals received from the sensor in the walking mode and carrying out the processing of calculating the number of steps by constituting two steps by each of the detecting signals received from the sensor in the running mode.

2. A pedometer according to claim 1; wherein the measuring mode setting means comprises an operating switch.

3. A pedometer according to claim 2; wherein the sensor outputs the detecting signal in correspondence with a landing motion of the measured person in walking and outputs the detecting signal in correspondence with an arm swinging motion of the measured person in running.

4. A pedometer according to claim 3; including a filter interposed between the sensor and the step number calculating means for filtering out detecting signals received from the sensor that are outside a predetermined range.

5. A pedometer according to claim 2; including a filter interposed between the sensor and the step number calculating means for filtering out detecting signals received from the sensor that are outside a predetermined range.

6. A pedometer according to claim 1; wherein the sensor outputs the detecting signal in correspondence with a landing motion of the measured person in walking and outputs the detecting signal in correspondence with an arm swinging motion of the measured person in running.

7. A pedometer according to claim 6; including a filter interposed between the sensor and the step number calculating means for filtering out detecting signals received from the sensor that are outside a predetermined range.

8. A pedometer according to claim 1; including a filter interposed between the sensor and the step number calculating means for filtering out detecting signals received from the sensor that are outside a predetermined range.

9. A pedometer for measuring the number of steps of a person in walking and in running, the pedometer comprising:
one sensor that is mounted to an arm of a person using the pedometer such that a sensitivity axis of the sensor extends in a length direction of the arm and that detects a physical motion of the person in walking and in running and outputs detecting signals, one for each step, in correspondence therewith;
measuring mode setting means for setting a mode of measuring the number of steps to one of a walking mode for measuring the number of steps in walking and a running mode for measuring the number of steps in running;
filtering means for passing detecting signals received from the sensor within a predetermined frequency range; and
calculating means for calculating the number of steps of the person in accordance with the set measuring mode by counting each detecting signal passing through the filtering means as one step in the walking mode and counting each detecting signal passing through the filtering means that is above a predetermined threshold level as two steps in the running mode.

10. A pedometer according to claim 9; wherein the predetermined frequency range corresponds to a range of detecting signals indicative of a person in walking.

11. A pedometer according to claim 9; wherein the predetermined frequency range corresponds to a range of detecting signals equal to half of those indicative of a person in running.

12. A pedometer according to claim 9; wherein the predetermined frequency range is 85 to 120 detecting signals per minute.

13. A pedometer according to claim 9; wherein the measuring mode setting means comprises an operating switch.

14. A pedometer according to claim 9; wherein the sensor outputs the detecting signal in correspondence with a landing motion of the person in walking and outputs the detecting signal in correspondence with an arm swinging motion of the person that occurs in alternate steps in running.

15. A pedometer according to claim 14; wherein the measuring mode setting means comprises an operating switch.

16. A pedometer according to claim 14; wherein the predetermined frequency range corresponds to a range of detecting signals indicative of a person in walking.

17. A pedometer according to claim 14; wherein the predetermined frequency range corresponds to a range of detecting signals equal to half of those indicative of a person in running.

18. A pedometer according to claim 14; wherein the predetermined frequency range is 85 to 120 detecting signals per minute.

19. A pedometer according to claim 9; wherein the sensor outputs detecting signals that are alternately of higher and lower levels when the person is running, the detecting signals of higher level that pass through the filtering means being above the predetermined threshold level and the detecting signals of lower level that pass through the filtering means being below the predetermined threshold level.

20. A pedometer according to claim 19; wherein the detecting signals of higher level correspond to an arm swinging motion of the person in running and the detecting signals of lower level correspond to a landing motion of the person in running.

* * * * *